United States Patent [19]

Scanlon

[11] Patent Number: 4,922,522

[45] Date of Patent: May 1, 1990

[54] TELECOMMUNICATIONS ACCESS TO LOTTERY SYSTEMS

[75] Inventor: John M. Scanlon, Mendham, N.J.

[73] Assignee: American Telephone and Telegraph Company, New York, N.Y.

[21] Appl. No.: 203,668

[22] Filed: Jun. 7, 1988

[51] Int. Cl.[5] .................. H04M 11/00; G06F 15/28; G06F 15/44

[52] U.S. Cl. ........................... 379/95; 379/84; 379/88; 379/97; 379/245; 364/412; 273/138 A

[58] Field of Search ................ 364/412; 273/138 A; 379/88, 89, 95, 97, 84, 77, 102, 104, 105, 245, 246

[56] References Cited

U.S. PATENT DOCUMENTS

| | | | |
|---|---|---|---|
| 3,920,908 | 11/1975 | Kraus | 179/2 CA |
| 4,427,848 | 1/1984 | Tsakanikas | 379/97 |
| 4,489,438 | 12/1984 | Hughes | 381/51 |
| 4,494,197 | 1/1985 | Troy et al. | 364/412 |
| 4,525,712 | 6/1985 | Okano et al. | 340/825.31 |
| 4,559,415 | 12/1985 | Bernard et al. | 179/2 DP |
| 4,679,143 | 7/1987 | Hagiwara | 364/412 |
| 4,689,742 | 8/1987 | Troy et al. | 364/412 |
| 4,692,863 | 9/1987 | Moosz | 364/412 |
| 4,697,282 | 9/1987 | Winter et al. | 379/67 |
| 4,757,267 | 7/1988 | Riskin | 379/88 |
| 4,845,739 | 7/1989 | Katz | 379/92 |

FOREIGN PATENT DOCUMENTS

| | | |
|---|---|---|
| 1162336 | 2/1984 | Canada . |
| 59-178572 | 10/1984 | Japan . |
| 60-126764 | 7/1985 | Japan . |
| 87/05764 | 9/1987 | PCT Int'l Appl. ............ 379/96 |
| 2147773 | 5/1985 | United Kingdom . |
| 2148135 | 5/1985 | United Kingdom . |

OTHER PUBLICATIONS

M. Schrage, "Von Meister's Not-So-Trivial Pursuit", *Washington Post*, pp. 1, 15, Sep. 23, 1985.

C. H. Howe, "Gotta Be In To Win", *Datamation*, Apr. 15, 1986, pp. 42–59.

"Corporate Winners in the Lottery Boom", *Fortune*, Sep. 3, 1984, pp. 21–25.

R. J. Frank et al., "Mass Announcement Capability", *The Bell System Technical Journal*, vol. 60, No. 6, Part 1, Jul.–Aug. 1981, pp. 1049–1081.

Primary Examiner—Jin F. Ng
Assistant Examiner—Wing F. Chan
Attorney, Agent, or Firm—Werner Ulrich

[57] ABSTRACT

A method and apparatus for operating a lottery system. Customers purchase lottery entries using their customer stations to send lottery entry data to a toll switching system equipped to prompt customers and accept lottery entries. Customer identification data for identifying purchasers is transmitted to that toll switching system in the form of automatic number identification signals from switching systems connected to the customers and personal identification codes keyed by customers. Lottery data is stored in the toll switching system and transmitted to a centralized lottery data base system for determining lottery winners. Advantageously, customers may purchase entries in existing, periodic draw lotteries from their own customer stations, using the shared facilities, and the high peak capacity for handling lottery traffic of a public switched network.

5 Claims, 4 Drawing Sheets

TELECOMMUNICATIONS ACCESS TO LOTTERY SYSTEMS

TECHNICAL FIELD

This invention relates to apparatus and methods for providing access to a lottery system.

PROBLEM

Lotteries, such as state run lotteries, have found increasing and widening acceptance throughout the United States. A problem with such lottery systems is that the customers are required to use an intermediary who has access to a centralized system data base to participate. Such an intermediary typically has a terminal for sending data describing the purchase of a lottery ticket to the centralized data base. Such intermediaries are typically located in public facilities such as railway stations, bowling alleys, restaurants, or shopping facilities.

In a co-pending patent application, Ser. No. 07/091,621, entitled "Use of Telecommunications Systems For Lotteries", assigned to the assignee of this application, arrangements are described for accessing a lottery from any telephone. However, these arrangements are designed for use with a lottery which provides immediate results to the purchaser of the lottery entry and hence has not been integrated into a conventional lottery system of the type which provides, for example, for a weekly drawing of lottery winners. A problem of the prior art, therefore, is that there is no satisfactory arrangement to allow lottery customers to purchase, without an intermediary, a lottery entry for a present day lottery featuring drawings at scheduled times to identify winners.

SOLUTION

The foregoing problem and deficiency is solved and an advance is made in the art in an illustrative embodiment of my invention by providing method and apparatus suitable for use with present day state lotteries having weekly drawings without any change and advantageously allowing lottery customers to enter lottery transactions directly using existing telephone plant facilities to do so. In one specific embodiment, existing "900 service" network arrangements and toll offices described in R. J. Frank et al.: "No. 4 ESS: Mass Announcement Capability", *Bell System Technical Journal*, Vol. 60, No. 6, July/August 1981, pp. 1049–1081 (Frank et al.), respond to customers and store customer lottery data. The selected toll systems are equipped with systems such as the mass announcement system provided in the AT&T 4 ESS TM toll switch and described in Frank et al. One or more of these toll switches, referred to hereinafter as a lottery switch, is further arranged to access a local or remote data base. This data base is used for storing lottery entry information. Advantageously, a common carrier lottery entry system economically accepts a higher peak of input traffic than a dedicated lottery entry system, as well as having the advantage of providing existing common carrier access to and from the lottery customers.

Therefore, in accordance with the principles of this invention, a customer station is connected to a switching system for accessing a lottery entry data base, data identifying a purchaser and a lottery entry is signaled to that switching system for storage in the lottry entry data base, and, after winning lottery numbers have been determined, a centralized lottery data base is searched to identify the purchaser of a winning lottery entry.

In accordance with one aspect of the invention, customer data is stored with each lottery entry. This is in contrast with present lottery systems which store no customer information because the purchaser of each lottery ticket is maintained anonymous. Advantageously, such information can be used for marketing the lottery store more effectively by determining the geographic areas where customers use the lottery most frequently.

In accordance with another aspect of the invention, customers purchasing a lottery entry are identified to the lottery switch by means of automatic number identification facilities at the local switch connected to the customer. The number identified by the automatic number identification equipment is forwarded to the lottery switch so that it may be entered in the data base. The number can then be used for billing a customer for a lottery entry. In accordance with one feature of the invention, this number is augmented by a personal identification number known only to the customer using the lottery so that only that customer may purchase a lottery entry from that telephone. Advantageously, such an arrangement prevents abuse of the lottery system by children or guests of the lottery purchaser, and permits an entry to be purchased from a public telephone station, such as a coin station.

The customer's number and lottery entry number are forwarded to a centralized lottery data base. The entry of this number into the centralized lottery data base makes it possible to call the winner of the lottery immediately after the drawing and avoids the problem of lost lottery tickets or winners who have forgotten that they own the winning lottery ticket. The centralized lottery data base is also accessible from the lottery switch for other purposes. For example, a lottery customer may not wish to use a particular lottery entry if that entry has already been purchased by another lottery customer; the centralized lottery data base can be queried by the lottery switch to ensure that this does not happen. The lottery switch may also store lottery entry numbers for repeated periodic entry, to be billed each time a number is entered in for new lottery drawing. Advantageously, lottery customers need not reoriginate a request each period, and are automatically billed via the common carrier.

In accordance with one aspect of the invention, customers are prompted by facilities for generating prompting announcements, such as the mass announcement system, to provide lottery purchase data. This data may be provided through customer keyed dual tone multi-frequency (DTMF) signals or may be spoken commands recognized by a speech recognition unit in the lottery switch.

In accordance with one aspect of the invention, customers may arrange to purchase automatically a lottery entry for each of a plurality of lottery drawings by purchasing the entry and specifying the number and timing of the lottery drawings for which this entry is to be purchased. The customer is then billed for each purchase at the time of the corresponding lottery period.

The lottery entry system can also be used by customers having data terminals, including ISDN (Integrated Services Digital Network) terminals. Advantageously, such customers can enter lottery entry data more efficiently than customers with DTMF stations.

DETAILED DESCRIPTION

Figure 1:
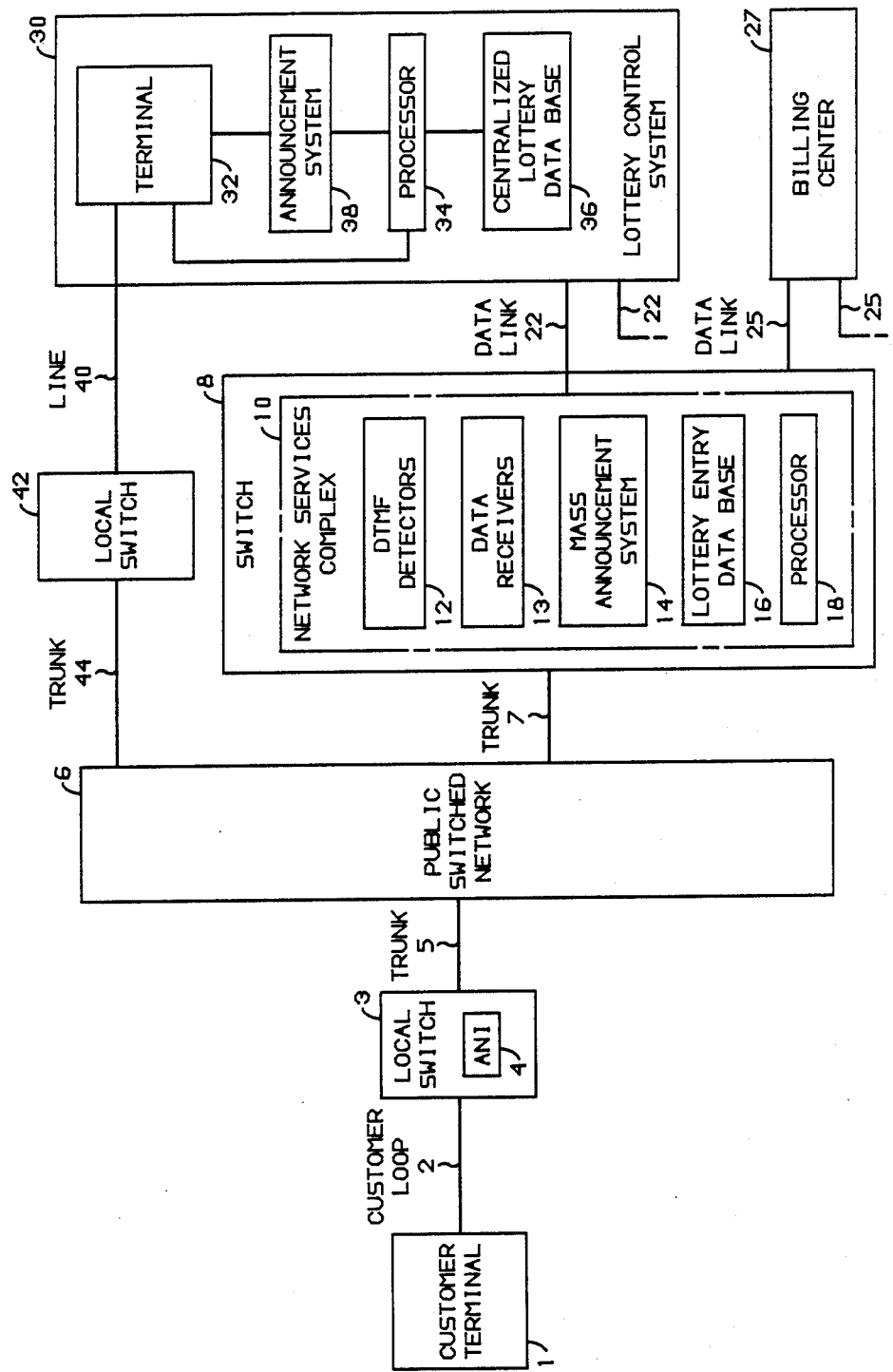
FIG. 1 is a block diagram illustrating a connection from a customer terminal to a switch equipped with facilities for processing a customer lottery purchase.

FIG. 1 illustrates how a customer may transmit a request to purchase a lottery entry to a data base sytem for recording such a purchase. The customer at customer terminal 1 is connected through that customer's loop 2 to a local switching system 3. The local switching system is equipped with facilities for automatic number identification 4. When the customer has dialed a number for accessing the lottery, the customer is connected through a trunk 5 to the public switched network 6 which in turn is connected through a trunk 7 to a lottery switch 8 adapted to provide lottery service. (Trunk 7 may be the same as trunk 5 in case local switching system 3 has direct access to the facilities for providing lottery service.) Lottery switch 8 in the present embodiment is a toll switch such as the 4 ESS switch manufactured by AT&T Network Systems. Switch 8 is equipped with a network services complex 10 for providing special services. The network services complex includes a mass announcement system 14 for providing prompting announcements to a plurality of users simultaneously, a group of DTMF detectors 12 for accepting DTMF signals from customers, data receivers 13 for receiving data from customer stations having data transmission capabilities, a data base 16 for storing data representing the customer's lottery purchases, and a program-controlled processor 18 for controlling the mass announcement system 14, the data base 16, and the DTMF detectors 12.

Switch 8 is connected by data link 22 to a centralized lottery control system 30. This lottery control system may be connected to a plurality of switches by other data links 22 if the lottery is sufficiently widespread so that a number of lottery switches geographically separated are used to accumulate lottery purchases from different regions. The lottery control system includes a terminal 32 for entering data representing lottery drawings and/or communicating with lottery winners. A procesor 34 for communicating with the terminal and with a data base 36 containing the data for lottery entry purchases and an announcement system 38 for announcing winning results to winners. The announcement system is especially useful for notifying minor winners since there are a substantial number of minor winners and can also be used for notifying major winners. The announcement system is connected by a line 40 to another local switch 42 which accesses public switched network 6 via trunk 44 to announce a winning result to the customer terminal from which the winning lottery entry was purchased. Switch 8 is also connected by data link 25 to a billing center 27 where telecommunications bills are prepared. This billing center receives data concerning accepted lottery entries for billing the customers who made these entries. Billing center 27 is also connected by other data links 25 to other switches.

Figure 2:
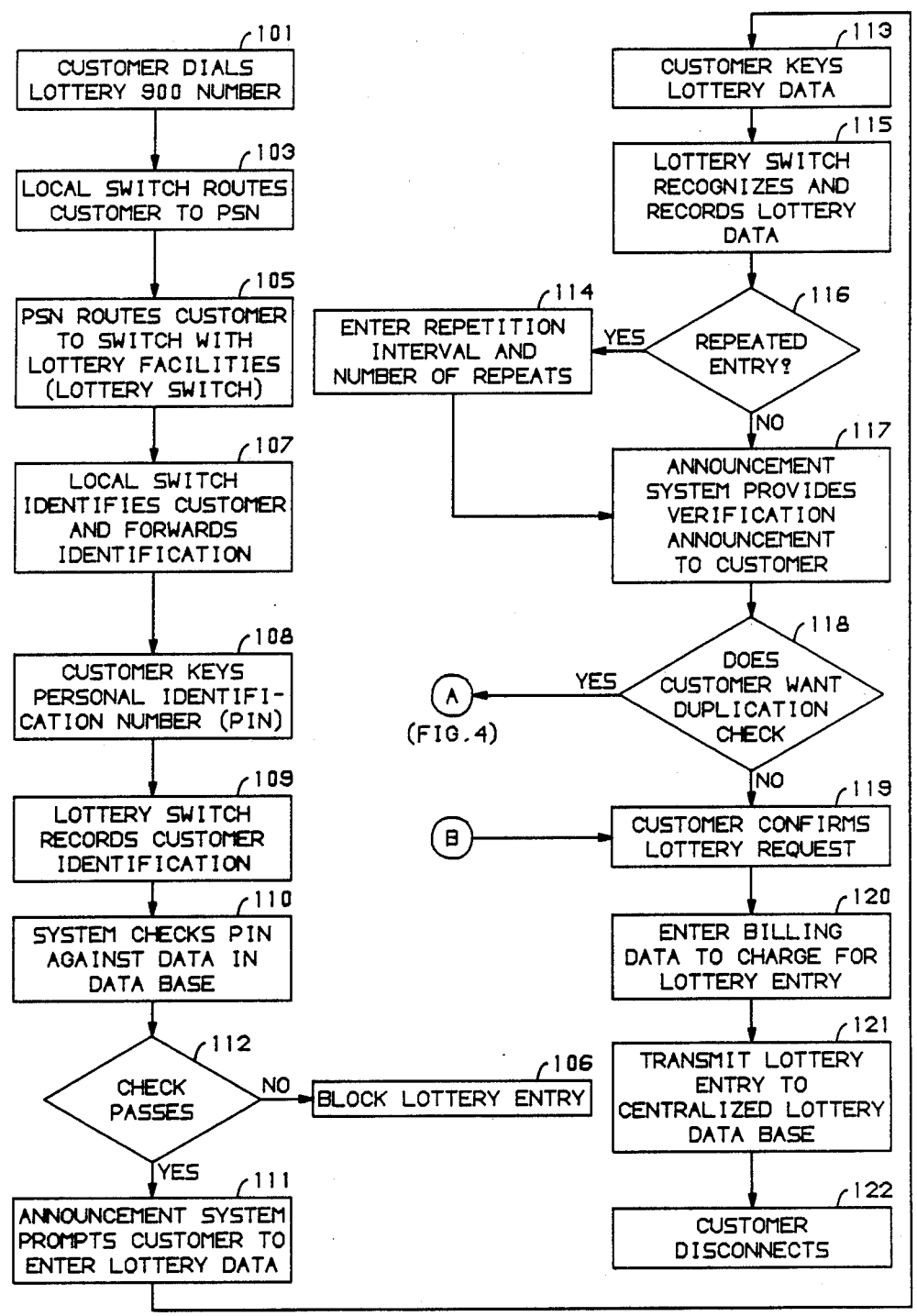
FIGS. 2-6 are flow diagrams of methods for processing such customer requests.
Figure 4:
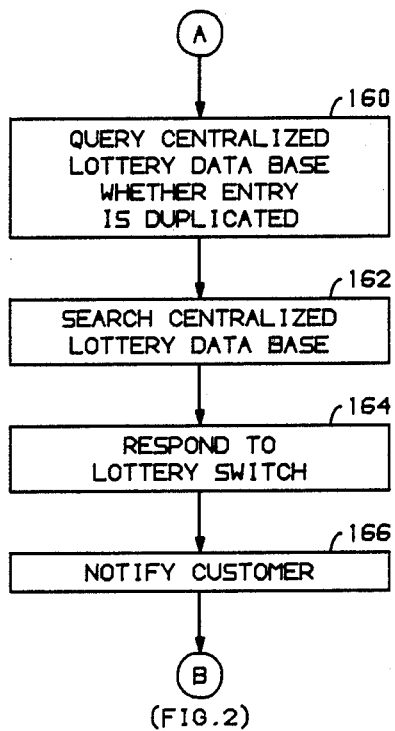

FIG. 2 is a flow diagram of the method of using the equipment of FIG. 1. A customer dials a 900 number for accessing the lottery (action block 101). The local switch routes the customer to the public switched network (action block 103) for subsequent routing to a switch having lottery facilities (action block 105). The local switch identifies the customer station and forwards that customer identification using automatic number identification arrangements (action block 107). After the customer is connected to the lottery switch, this identification is further augmented by a personal identification number keyed by the customer (action block 108). Use of a personal identification number, such as a credit card number, is especially important if the call is from a public telephone. The lottery switch records the customer identification (block 109) so that the customer's subsequent lottery entry may be billed and, importantly, tied to that customer in case the lottery entry is subsequently foundto respresent a winning number. The system then checks the personal identification number against data in the data base (action block 110). If the check does not pss (test 112), the lottery entry is blocked (action block 106). If the check passes (test 112), the announcement system of the lottery switch them prompts the customer to enter lottery entry. The lottery entry might be a complete lottery number or it might be a special code requesting that a random number be generated and used as the customer's lottery entry. The customer keys the lottery entry (action block 113) which is recognized by the DTMF detectors 12 of the lottery switch 8 and recorded in data base 16 under the control of processor 18 (action block 115). Next, the announcement system queries the customer whether the customer wants to make a repeated entry and the customer responds with a keyed signal indicating "yes" or "no" (test 116). If "no", action block 117 is performed. If "yes", the customer is prompted to enter the repetition interval and the number of repeats authorized by this entry (action block 114). Thereafter, action block 117 is executed. The entry is associated with the previously entered customer identification data. The announcement system then provides a verification announcement to the customer (action block 117). This verification announcement may include, for example, the identification of the lottery request so that if necessary the customer can delete that request and substitute another. Test 118 is used to determine whether a customer wants a duplication check. Some lottery customers would prefer not to purchase a lottery entry if they know that another customer has already purchased that entry. In lottery systems such as the Illinois State lottery system, all holders of winning lottery entries must share and since each lottery number is equally likely to be a winning number, it is to the advantage of lottery entry purchasers to purchase a unique entry. If the customer indicates that a duplication check should be made, then the actions shown in FIG. 4 are performed. If not, or after the actions of FIG. 4 are performed, the customer keys a confirmation of the lottery entry (action block 119) on the basis of which billing data is entered to charge for that lottery entry (action block 120), the entry is sent to centralized lottery data base 36 (action block 121) and the customer can is disconnected (action block 122). If, at any time prior to keying in the confirmation, the customer decides to disconnect or keys a reversed denial signal such as a number sign, the lottery entry is cleared from the data base and no billing data is entered so that the customer will not be charged for that lottery entry.

Figure 3:
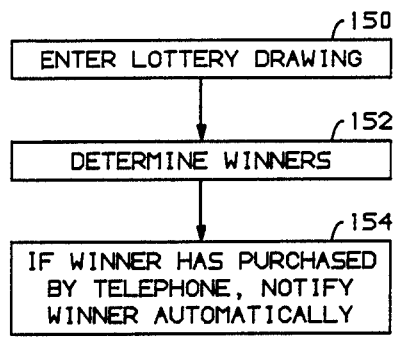

FIG. 3 is a flow diagram of the actions performed after the lottery drawing. The lottery drawing numbers are entered into the lottery control system (action block 150). These numbers are then compared with the numbers in data base 36 to determine winners (action block 152). Finally, if one or more of the winners have purchased their entry by telephone then the winners are notified automatically (action block 154).

While this specific embodiment uses DTMF detectors and data receivers, it is also possible to augment such detectors with speech detectors or to use combined speech and DTMF detectors so that customers who are calling from customer stations not equipped with DTMF signaling can use spoken commands to control the recording of a lottery entry in the lottery switch.

Once entries have been recorded in the data base of the lottery switch, they are transmitted to a centralized lottery control data base 36 for processin in the conventional way that lottery entries are processed using existing lottery systems.

FIG. 4 illustrates the actions performed if a lottery customer wants to check whether the lottery entry that has just been made is a duplicate entry. The lottery switch 8 sends a message to lottery control system 30 to query centralized lottery data base 36 whether the lottery entry is duplication (action block 160). The centralized lottery data base is searched for such a duplicate (action block 162) and a response message is returned to lottery switch 8 (action block 164). Using the announcement system 14, the customer is notified of the result of searches for a duplicate entry. Since the search is performed before the lottery entry is made final, the customer has the option to cancel that lottery entry. The results that are returned can include not only the answer of whether the lottery entry is duplicated, but an indication of how often the entry is duplicated.

Figure 5:
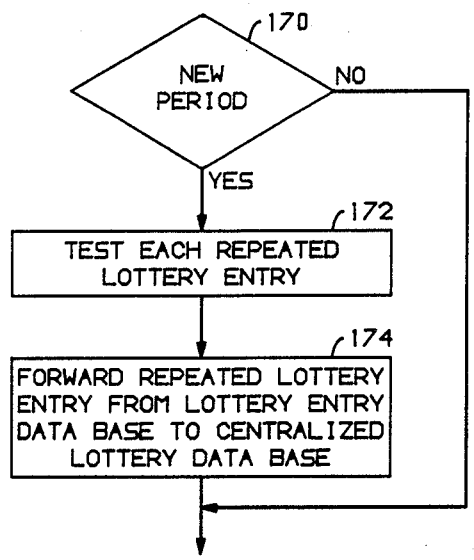

FIG. 5 illustrates actions performed to implement the repeated lottery entry feature. At the beginning of each lottery period as established by test 170, each repeated lottery entry is tested (action block 172). If this period corresponds to one of the periods identified by the customer's repeated lottery entry request, then that lottery entry is forwarded from the lottry entry data base to the centralized lottery data base (action block 174). At the time the repeated lottery entry was made (action block 114, FIG. 2), the frequency of lottery entries and the number of such entries to be made based on the customer's authorization were entered into the lottery entry data base. These numbers are examined to see if the customer still has at least one remaining lottery entry authorized and if this present period is one of the periods selected by the customer. Advantageously, the repeated lottery entries are placed in the centralized lottery data base early so that other customers who do not wish to make a duplicate lottery entry will be discouraged from using that lottery entry. Alternatively, the lottery entry arrangement could prohibit duplicate lottery entries automatically.

Figure 6:
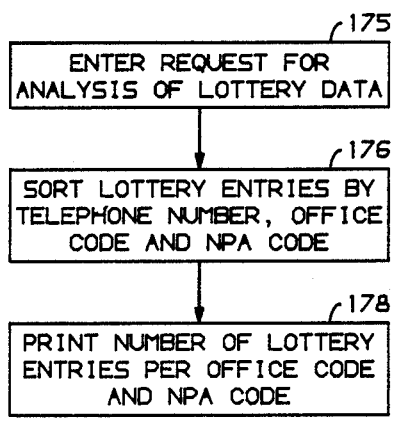

FIG. 6 shows the actions performed in response to a request for an analysis of lottery entry data. The request is initially entered (action block 175) from terminal 32 in lottery control system 30. In response, the lottery control system sorts lottery entries by telephone number office codes and also by numbering plan area codes (action block 176). The number of lottry entries for each office code and each numbering plan area code are then printed out or displayed at terminal 32 (action block 178).

While, in this exemplary embodiment of the invention, the lottery entry data base and the centralized lottery data base are separate, they can be merged for other systems, either by using the data link to communicate with the centralized data base for data that is stored herein in the lottery entry data base, or by concentrating all lottery traffic into one switch and using the data base accessible by that switch for both purposes.

It is to be understood that the above description is only of one preferred embodiment of the invention. Numerous other arrangements may be devised by one skilled in the art without departing from the spirit and scope of the invention. The invention is thus limited only as defined in the accompanying claims.

I claim:

1. A method of operating a lottery comprising the steps of:

responsive to reception of a lottery access number from a purchaser's customer telephone station, establishing a connection from a switcing system of a publicly accessible common carrier telephone network having a mass announcement means for processing a large number of lottery entries simultaneously, for accessing a lottery entry data base to said customer station;

receiving lottery entry data from said customer station in said switching system over said connection for storage in said lottery entry data base, receiving data in said switching system for identifying a purchaser of a lottery entry for storage in said lottery entry data base, said receiving data for identifying a purchaser comprising receiving, from another switching system, data identifying said customer station;

transmitting said lottery entry data and said data identifying a purchaser to a centralized lottery data base for searching said centralized lottery data base to identify a purchaser of a winning lottery entry in response to receipt of identified lottery winner numbers established in a periodic lottery drawing;

wherein said data identifying said customer station comprises a customer station number;

further comprising;

sorting lottery entries by customer station numbers, said numbers sorted by telephone number office codes and numbering plan area codes of said customer station numbers, for generating reports identifying how many lottery entries were purchased by each of a plurality of blocks of customer station numbers.

2. A method of operating a lottery comprising the steps of:

responsive to reception of a lottery access number from a purchaser's customer telecommunications station, establishing a connection from a switching system for accessing a lottery entry data base to said customer station;

receiving lottery entry data from said customer station in said switching system over said connection for storage in said lottery entry data base;

receiving data in said switching system for identifying a purchaser of a lottery entry for storage in said lottery entry data base;

querying said lottery data base to identify if a requested lottery entry number already exists in said lottery data base;

responsive to said querying, notifying a customer of the presence of any lottery entries duplicating said requested lottery entry number; and transmitting said lottery entry data and said data identifying a purchaser to a centralized lottery data base for searching said centralized lottery data base to identify a purchaser of a winning lottery entry in response to receipt of identified lottery winner numbers established in a periodic lottery drawing.

3. A method of operating a lottery comprising the steps of:

responsive to reception of a lottery access number from a purchaser's customer telecommunications station, establishing a connection from said customer station to a switching system for accessing a lottery entry data base;

signaling data identifying said customer station to said switching system for storage in said data base wherein said data identifying said customer station comprises a customer station number;

transmitting oral prompting commands from said switching system to said customer station for prompting a purchaser at said customer station to signal a personal identification code and lottery entry data;

responsive to said prompting commands, signaling a personal identification code from said customer station;

checking said personal identification code against data stored in said data base;

blocking entry into said data base of lottery entry data representing a lottery entry for a purchaser at said customer station if said check of said personal identification number fails;

further responsive to said prompting commands, signaling lottery entry data from said customer station to said switching system for storage in said data base if said check of said personalidentification number succeeds;

billing a customer identified by said data identifying said customer station and said personal identification code for a lottery entry comprising said lottery entry data;

responsive to receipt of identified lottery winner numbers established in a periodic lottery drawing, searching a centralized lottery data base to identify a purchaser of a winning lottery entry;

repetitively accepting lottery entry records comprising customer station identification numbers; and sorting said lottery records by customer station identification numbers, said numbers sorted by telephone number office codes and numbering plan area codes of said numbers, for generating reports identifying how many lottery entries were purchased by each of a plurality of blocks of customer station numbers.

4. A method of operating a lottery comprising the steps of:

responsive to reception of a lottery access number from a purchaser's customer telecommunications station, establishing a connection from said customer station to a switching system for accessing a lottery entry data base;

signaling data identifying said customer station to said switching system for storage in said data base;

transmitting oral prompting commands from said switching system to said customer station for prompting a purchaser at said customer station to signal a personal identification code and lottery entry data;

responsive to said prompting commands, signaling a personal identification code from said customer station;

checking said personal identification code against data stored in said data base;

blocking entry into said data base of lottery entry data representing a lottery entry for a purchaser at said customer station if said check of said personal identification number fails;

further responsive to said prompting commands, signaling lottery entry data from said customer station to said switching system for storage in said data base if said check of said personal identification number succeeds;

billing a customer identified by said data identifying said customer station and said personal identification code for a lottery entry comprising said lottery entry data;

querying a lottery data base to identify if a requested lottery entry number already exists in said lottery data base;

responsive to said querying, notifying a customer of presence of any lottery entries duplicating said requested lottery entry number; and responsive to receipt of identified lottery winner numbers established in a periodic lottery drawing, searching a centralized lottery data base to identify a purchaser of a winning lottery entry.

5. A switching system, comprising:

means for processing input signals from customer telecommunications stations to identify lottery entry numbers;

means for processing identification signals from other switching systems, to identify customer stations transmitting said input signals;

data base means for storing said lottery entry numbers and said customer station identifications;

means responsive to receipt of said input signals for transmitting said lottery entry numbers to a centralized lottery data base for subsequent comparison against identified lottery winner numbers;

means for transmitting to said centralized lottery data base a message comprising lottery entry numbers from one of said customer stations and data indicating a request for information indicating a presence in said centralized data base of other lottery entries comprising said lottery entry numbers from said one of said customer stations; and means responsive to a message received from said centralized lottery data base for transmitting a message to said one of said customer stations indicating the presence of other lottery entries comprising said lottery entry numbers from said one of said customer stations.

* * * * *